Figure 1:
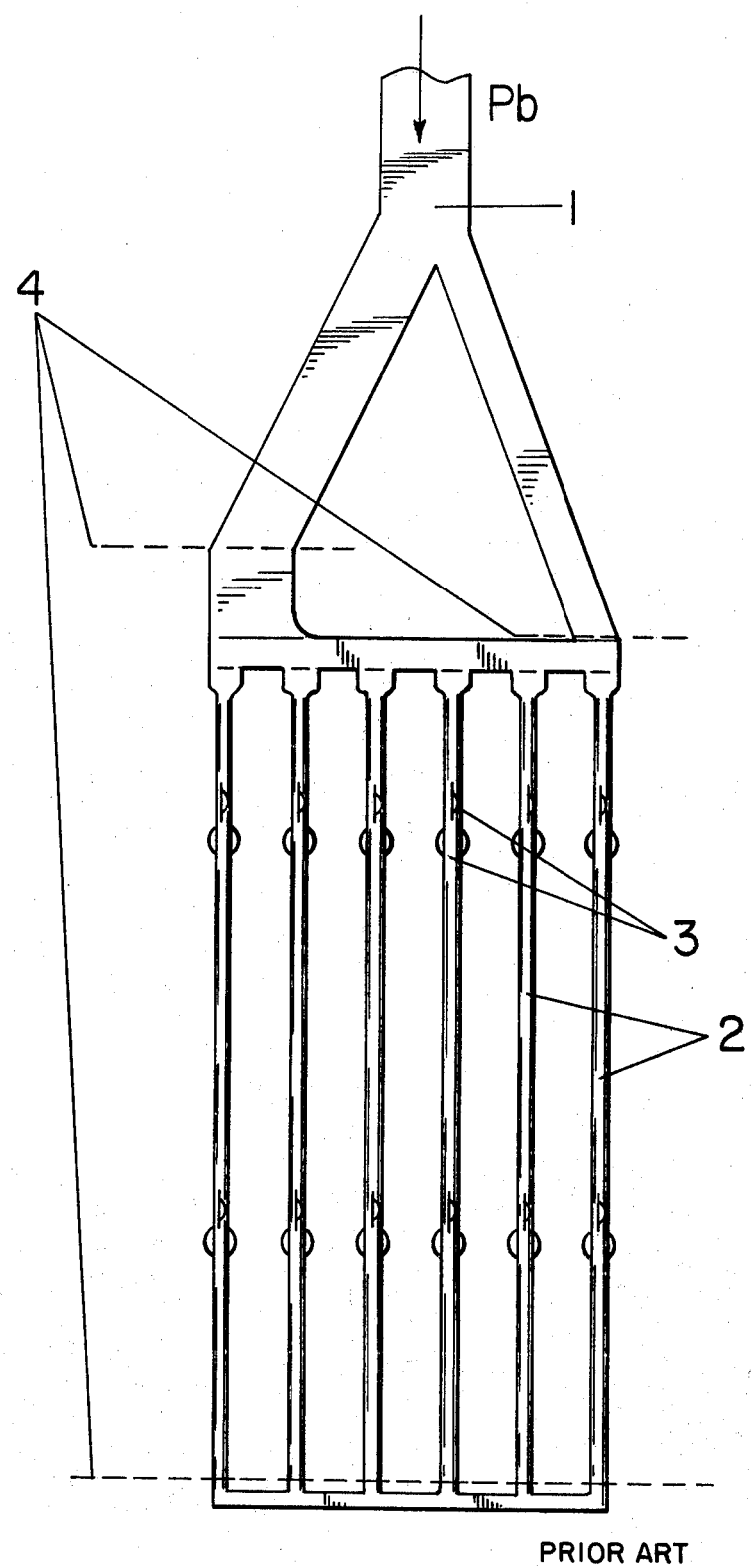

United States Patent [19]

Ruetschi

[11] 4,315,977
[45] Feb. 16, 1982

[54] MOLD FOR CASTING GRID FOR TUBULAR PLATES OF A LEAD-ACID BATTERY AND RESULTING CASTING

[75] Inventor: Paul Ruetschi, Yverdon, Switzerland
[73] Assignee: Leclanché S.A., Yverdon, Switzerland
[21] Appl. No.: 179,084
[22] Filed: Aug. 18, 1980

Related U.S. Application Data

[63] Continuation of Ser. No. 16,439, Mar. 1, 1979, abandoned.

[30] Foreign Application Priority Data

Mar. 6, 1978 [CH] Switzerland .............. 2426/78

[51] Int. Cl.³ .............. B22C 9/22; B22D 25/04; H01M 4/73
[52] U.S. Cl. .............. 429/233; 29/2; 164/DIG. 1; 249/60
[58] Field of Search .............. 164/133, 135, 359, 360, 164/363, DIG. 1; 29/2, 623; 249/60, 109, 110, 203; 429/233, 238, 241

[56] References Cited

U.S. PATENT DOCUMENTS

| | | | |
|---|---|---|---|
| 870,817 | 11/1907 | Custer | 164/135 |
| 907,520 | 12/1908 | McNaughton | 164/363 |
| 1,042,092 | 10/1912 | Custer | 164/133 |
| 1,368,445 | 2/1921 | Little | 164/133 |
| 1,404,682 | 1/1922 | Barker | 164/363 X |
| 1,790,108 | 1/1931 | Meyer | 164/363 X |
| 2,508,865 | 5/1950 | Lund | 164/DIG. 1 |
| 3,981,742 | 9/1976 | Yonezu et al. | 429/241 X |

FOREIGN PATENT DOCUMENTS 227411 5/1925 United Kingdom .
308131 3/1929 United Kingdom .

OTHER PUBLICATIONS

Witte, E.; *Bleiakkumulatoren*, Mainz, Germany, 3rd Edition, 1969, pp. 22 and 23.
Ruetschi, P.; "Review of the Lead-Acid Battery Science and Technology", In *Journal of Power Sources*, vol. 2, 1977–1978, p. 3.

Primary Examiner—Robert D. Baldwin
Assistant Examiner—J. Reed Batten, Jr.
Attorney, Agent, or Firm—Lockwood, Dewey, Alex & Cummings

[57] ABSTRACT

In casting tubular-plate grids, a molten lead alloy is poured into a mold along the long side of the grid perpendicular to the grid rods. Temporary connectors joining adjacent grid rods are simultaneously cast. These connecting portions have a thickened cross-section in the middle and a constricted cross-section at their points of junction with the grid rods. In a subsequent operation, the connecting portions are punched out.

7 Claims, 3 Drawing Figures

MOLD FOR CASTING GRID FOR TUBULAR PLATES OF A LEAD-ACID BATTERY AND RESULTING CASTING

This is a continuation of application Ser. No. 16,439, filed Mar. 1, 1979 and now abandoned.

This invention relates to producing grids for tubular plates of lead storage batteries.

For many years now, so-called tubular plates have been used as positive electrodes in lead storage batteries of both the stationary and traction types. Such tubular plates are also known as "ironclad plates." They are described, for example, in *Bleiakkumulatoren*, by E. Witte, published by Otto Krausskopf Verlag, Mainz, Germany (3rd edition, 1969, pages 23–34), and in the *Journal of Power Sources*, Vol. 2, 1977–78, page 3.

Positive tubular plates consist of a series of porous plastic tubes having an outside diameter of about 9 mm and disposed parallel to one another, which tubes are filled with lead oxide after the insertion of central, round grid rods of a corrosion-resistant lead alloy. The filled plates are subjected to anode treatment in dilute sulfuric acid, whereupon the lead oxide is oxidized to lead dioxide.

The plastic tubes ordinarily used nowadays are made, for example, of acid-proof, chlorine-free fibers. Fibers of glass, polypropylene, or polyester are preferred for their excellent durability.

Fabrics of multifilament polyester yarn having wall thicknesses of from 0.3 to 0.4 mm and pore openings of less than 0.2 mm are commercially available at the present time in the form of multi-tube pockets for tubular-plate batteries.

One advantage of tubular-plate batteries as compared with those having conventional pasted grid plates is their long life in cyclical operation. For example, tubular plate batteries can withstand from 1000 to 2000 charge-discharge cycles of a certain type, whereas batteries having ordinary pasted plates, in comparison, can withstand only 400 to 800 cycles of the same kind. The reason is that in the case of tubular plates, the positive active material, consisting of lead dioxide particles, is firmly confined within the tubes and therefore cannot "wash out," i.e., break loose from the electrode and disintegrate.

On the other hand, the casting of the hard-lead grids for tubular plates presents greater difficulties. As a result of increasing energy requirements and the relatively small floor surface in electrical vehicles, rather tall cells must often be constructed for traction batteries, which means tall plates as well. Although the central grid rods are typically only 3 mm in diameter, they must be produced in lengths of up to 800 mm or more.

Very tall plates entail particular problems as regards casting. Pressure die-casting methods are widely used nowadays for producing tubular-plate grids. Special die-casting machines for this purpose are commercially available from a number of manufacturers. In such machines, the lead is injected into the die under pressure in the longitudinal direction of the lead rods through a conical nozzle. The longer the casting, the more expensive the die-casting machine. Experience has shown that the pressure die-casting of grids containing very little or no antimony presents particular difficulties, for the casting properties of the lead alloys decrease as the antimony content is reduced. Until now, therefore, it has customarily been necessary to use lead alloys containing up to 12% antimony for tubular-plate grids, depending upon the height of the plate.

The high antimony content of the lead grids is, however, undesirable. Firstly, it makes the battery more expensive since antimony costs a great deal more than lead. Secondly, technical drawbacks arise when the antimony content is high. Antimony which is dissolved out of the grid by anodic oxidation diffuses in the electrolyte to the negative plate, where it is deposited in the form of metallic antimony. The result is antimony contamination of the negative plate, for antimony reduces the hydrogen overvoltage of the negative lead electrodes. Hydrogen is then generated much more rapidly, which leads to increased self-discharge of the negative electrodes. When the battery lies unused for a longer period of time, the acid density drops as a result of the self-discharge, and this in turn accelerates the corrosion of the positive grids. Moreover, the generation of hydrogen means a loss of water for the battery. Consequently, there must be more frequent addition of water, i.e., more maintenance.

It would therefore be advantageous to produce tubular-plate grids of alloys having a low antimony content or none at all.

It is an object of this invention to provide a means by which antimony-free or low-antimony tubular-plate grids can be easily and simply produced. This should also enable the casting of very tall grids without difficulty.

To this end, producing grids for tubular plates of lead storage batteries according to the present invention is characterized in that in casting the grids a molten lead alloy is poured in at the long side of the grid perpendicular to the direction of the grid rods, that connecting portions joining adjacent grid rods are simultaneously cast in the grid, and that the connecting portions between adjacent grid rods are punched out in a subsequent operation, leaving the grid rods themselves intact, whereby finished tubular-plate grids are obtained.

Figure 2:
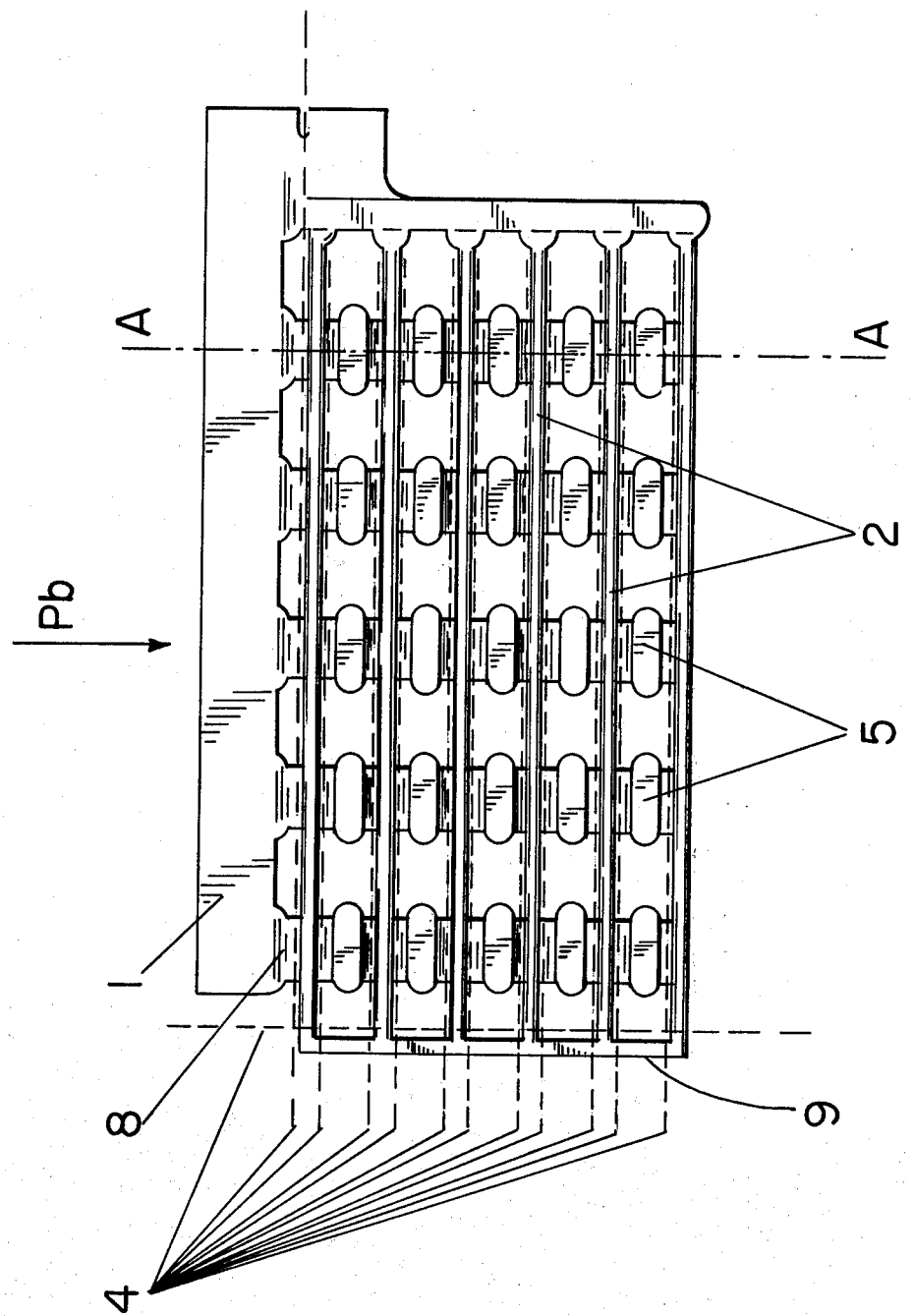
Figure 3:
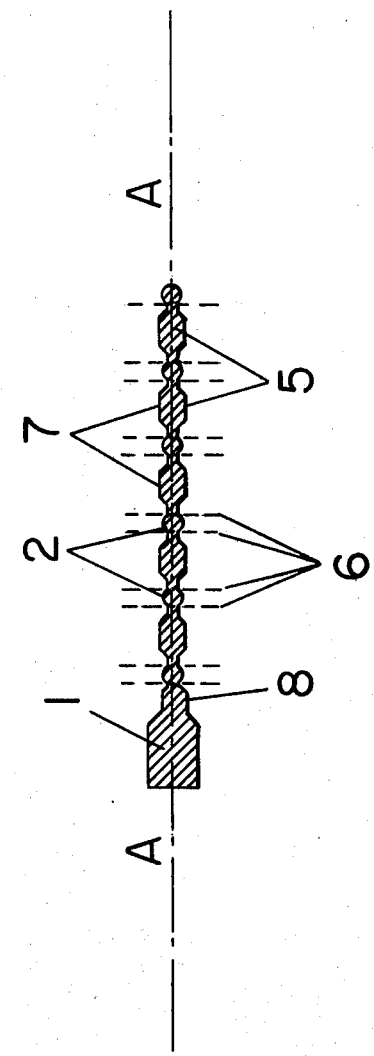

A preferred embodiment of the invention will now be described in detail, by way of example, with reference to the accompanying drawings, in which:

FIG. 1 is a diagrammatic representation of a prior art mold for tubular-plate grids, FIG. 2 is a diagrammatic representation of the mold according to an embodiment of the present invention, and FIG. 3 is a section taken on the line A—A of FIG. 2 after the mold has been filled with metal.

FIG. 1 illustrates a prior art mold for casting of tubular-plate grids. A molten lead alloy is injected into a mold through sprues 1, parallel to the longitudinal axes of grid rods 2, by means of a pressure machine. The grid rods 2 are about 3 mm in diameter and are normally provided with centering lugs 3. After casting, the grid is trimmed along the cutting surfaces 4.

Experience has shown that with a pressure die-casting machine which is sold commercially for this purpose, grid rods of a certain length can be produced only if the antimony content of the lead alloy is sufficiently high. The amounts of antimony required for various grid lengths have been determined experimentally and are set forth in Table 1 below. The values given apply to a conventional machine which is recommended for the casting of tubular-plate grids and operates at an air pressure of 10 atm and a casting temperature of 400°–450° C.

TABLE 1

| Grid Length in mm | Required Antimony Content |
| --- | --- |
| 200 | 4% |
| 400 | 7% |
| 600 | 10% |
| 800 | 12% |

With this machine, therefore, no long grids can be produced from low-antimony or antimony-free lead alloys. In order to cast such grids, it would presumably be necessary to use much more expensive machines operating at a higher pressure if conventional die-casting methods were to be retained.

FIG. 2 illustrates the casting mold according to an embodiment of the present invention. The molten lead alloy is introduced into the mold along the longer side of the grid, substantially along the entire length thereof, perpendicular to the grid rods 2. Gates 8 of an appropriate cross-section are provided at regular intervals in the mold between the runner 1 and the grid. Between the grid rods 2, temporary connecting portions 5 are simultaneously cast at intervals of preferably 20-120 mm.

A preferred form of the temporary connections 5 may be seen in FIG. 3. Constricted locations 6 are provided for facilitating a punching operation to be described below. The cross-section of lead to be cut through is thus kept small. The constricted locations 6 also serve to guide the punching tool. Thick portions 7 of the connectors 5 facilitate the filling of the mold with lead. During casting, the air in the mold can first retreat into the spaces corresponding to the portions 7 of the connectors 5. As the filling of the mold with lead alloy progresses, a supply of heat forms in these spaces. The larger mass of lead constituting the portions 7 cools more slowly than that at the constricted locations 6 or in the grid rods 2. The shrinkage occurring as a result of the subsequent cooling can then take place in the thicker connector portions 7, thereby ensuring complete filling of the grid rods 2.

The thick portions 7 of the temporary connectors 5 are preferably larger in cross-section than the individual grid rods 2. For example, the thick portions 7 may be 2-6 mm thick and 10-30 mm long, and the constricted locations 6 may be 0.8-1.6 mm thick and 5-20 mm long. It has proven advantageous to make the locations 6 shorter than the portions 7. Here, too, the grid rods 2 include the known centering lugs 3 (not shown in FIGS. 2 and 3). The temporary connectors 5 between the rods 2 may equally well be punched out with a tool which leaves a small part of the connector subsisting in the form of a centering lug 3.

The mold and the casting described above for producing grids can naturally also be applied analogously to tubular plates having oval tubes.

The casting of grids with temporary connectors can be carried out either manually or in a less expensive grid-casting machine such as is used for negative grid plates, i.e., by gravity die casting rather than pressure die casting. Hence, one advantage of this invention is that it needs no expensive pressure die-casting machine. It would naturally also be possible to use a simple pressure die-casting machine, but the use of pressure has proven not to be absolutely necessary.

The molten lead may be poured into the mold at the top. In special cases, however, it may enter the mold by bottom pouring, with the necessary flow of lead coming from a heated storage vessel situated at a higher level.

After casting, the temporary connectors 5 between the grid rods 2, as well as the sprue 1 and an end portion 9, are punched off, the grid rods 2 remaining intact. The cut 4 takes place at the constricted locations 6. The punching tools are of a suitable shape for precise guiding over the casting. In order to keep the punching tool small, the rows of temporary connectors may also be punched individually, in succession, the grid being displaced each time by the respective distance between the rows.

In this manner, a grid can be produced which ultimately has the appearance of a normal grid for tubular plates.

The present invention allows the casting of grids for tubular plates with lead alloys having a minimal antimony content. Thus, grids having antimony contents of 0-4% can very easily be cast. For such lead alloys, it is preferable to add 0.3-0.5% arsenic. The invention is also suitable for casting grids of completely antimony-free lead-calcium alloy, for example.

The advance exhibited by the present invention consists in the provision of a simple, efficient, and inexpensive means of production even for low-antimony and antimony-free positive tubular-plate grids.

What is claimed is:

1. A mold for casting grids for tubular plates of a lead-acid battery, the mold having generally complementary halves comprising:
   an array of long, parallel grid rod channels to form parallel grid rods for a lead-acid battery grid;
   said array of grid rod channels being connected at both ends thereof with end portion channels, one of said end portion channels forming a connection end portion to connect together the parallel grid rods at one end of a finished grid, the other of said end portion channels forming a temporary end portion connector that is subsequently removed from between the other ends of the parallel grid rods of the finished grid;
   a plurality of temporary intermediate large connector portion channels between said grid rod channels to form a plurality of temporary intermediate connecting portions between said parallel grid rods;
   a generally horizontal runner channel at the top of said mold, said runner channel having a plurality of gates that are generally perpendicular to the grid rod channels and that open into the top end of each of said temporary intermediate connector channels; and
   each of said temporary intermediate connector channels having a thick portion between said grid rod channels and having a constricted location between each of said thick portions and said grid rod channels, whereby said temporary intermediate connectors that are formed upon casting are subsequently readily removed from between the parallel grid rods.

2. A mold in accordance with claim 1, wherein said connecting portions between adjacent said grid rods are spaced from 20 to 120 mm from one another.

3. A mold in accordance with claim 1, wherein said connecting portions are from 0.8 to 6 mm thick and from 5 to 30 mm long.

4. A lead alloy casting designed to become a finished grid for a tubular plate in a lead-acid battery, said casting comprising:

an array of long, parallel grid rods for a lead-acid battery;

a connection end portion connecting together each of said plurality of long, parallel grid rods at one end thereof in the finished grid;

a temporary end portion connecting together each of said plurality of long, parallel grid rods at an opposite end thereof, said temporary end portion being removed in the finished grid;

a plurality of temporary intermediate connecting portions connecting said parallel grid rods at locations between said connection end portion and said temporary end portion;

a runner having a plurality of gate members connected to each of said plurality of temporary intermediate connecting portions; and each of said temporary intermediate connecting portions has a portion of thickened cross-section between said grid rods and a portion of constricted cross-section between each of said portions of thickened cross-section and each of said grid rods, whereby said temporary intermediate connectors are readily punched out from between the parallel grid rods of the finished grid.

5. A casting in accordance with claim 4, wherein the cross-section of said portion of thickened cross-section is greater than the cross-section of said grid rods.

6. A casting in accordance with claim 4, wherein the thickness of said portion of constricted cross-section is less than that of said grid rods.

7. A casting in accordance with claim 4, wherein said portion of thickened cross-section is longer than said portion of constricted cross-section.

* * * * *

UNITED STATES PATENT AND TRADEMARK OFFICE
CERTIFICATE OF CORRECTION

PATENT NO. : 4,315,977
DATED : February 16, 1982
INVENTOR(S) : Paul Ruetschi

It is certified that error appears in the above-identified patent and that said Letters Patent are hereby corrected as shown below:

Column 3, line 6, under the heading "Required Antimony Content",

"7%" should read --8%--.

Signed and Sealed this

Eighth Day of June 1982

[SEAL]

Attest:

Attesting Officer

GERALD J. MOSSINGHOFF

Commissioner of Patents and Trademarks